United States Patent
Campbell

[11] 3,919,177
[45] Nov. 11, 1975

[54] P-PHENYLENE SULFIDE POLYMERS
[75] Inventor: Robert W. Campbell, Bartlesville, Okla.
[73] Assignee: Phillips Petroleum Company, Bartlesville, Okla.
[22] Filed: Aug. 8, 1974
[21] Appl. No.: 495,450

Related U.S. Application Data
[63] Continuation-in-part of Ser. No. 416,776, Nov. 19, 1973, abandoned.

[52] U.S. Cl. ................................ 260/79.1; 260/79
[51] Int. Cl.² ...................................... C08G 75/14
[58] Field of Search ............................ 260/79, 79.1

[56] References Cited
UNITED STATES PATENTS
3,409,594  11/1968  Slovinsky ........................... 260/79
3,763,124  10/1973  Edmonds, Jr. ...................... 260/79
3,786,035   1/1974  Scoggin ............................ 260/79.1

Primary Examiner—Melvyn I. Marquis

[57] ABSTRACT p-Phenylene sulfide polymers are produced by reacting at least one p-dihalobenzene with a mixture in which at least one after-defined source of sulfur, at least one alkali metal carboxylate and at least one organic amide are contacted. With applicable sulfur sources other than alkali metal sulfides and alkali metal bisulfides, at least one base is also required. Use of the carboxylates results in p-phenylene sulfide polymers of higher molecular weight as evidenced by higher inherent viscosity and lower melt flow.

45 Claims, No Drawings

P-PHENYLENE SULFIDE POLYMERS

This application is a continuation-in-part of my copending application having Ser. No. 416,776 filed Nov. 19, 1973 and now abandoned.

This invention pertains to the production of p-phenylene sulfide polymers. designate In one of its more specific aspects this invention pertains to a novel method of producing novel p-phenylene sulfide polymers, and to the polymers themselves.

In U.S. Pat. No. 3,354,129, the disclosure of which is incorporated herein by reference, there is disclosed a method of producing polymers from polyhalo-substituted aromatics, alkali metal sulfides and polar organic compounds.

In accordance with one embodiment of the present invention a p-phenylene sulfide polymer is produced by reacting at least one p-dihalobenzene with a mixture in which at least one suitable source of sulfur, at least one alkali metal carboxylate and at least one organic amide are contacted. With suitable sulfur sources other than alkali metal sulfides and alkali metal bisulfides, at least one base is also required. Use of the carboxylates results in a p-phenylene sulfide polymer of higher molecular weight, as evidenced by a higher inherent viscosity and a lower melt flow, than that obtained in the absence of the carboxylates.

p-Dihalobenzenes which can be employed in the process of this invention can be represented by the formula

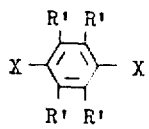

where each X is selected from the group consisting of chlorine, bromine, and iodine, and each R' is selected from the group consisting of hydrogen and hydrocarbyl in which the hydrocarbyl can be alkyl, cycloalkyl, and aryl radicals and combinations thereof such as alkaryl, aralkyl, and the like, the total number of carbon atoms in each molecule being within the range of 6 to about 24, with the proviso that in at least 50 mole percent of the p-dihalobenzene employed each R' must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro- p-xylene, 1-ethyl-4-isopropyl-2,5-dibromobenzene, 1,2,4,5-tetramethyl-3,6-dichlorobenzene, 1-butyl-4-cylcohexyl-2,5-dibromobenzene, 1-hexyl-3-dodecyl-2,5-dichlorobenzene, 1-octadecyl-2,5-diidobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5.-dichlorobenzene, and the like, and mixtures thereof.

Alkali metal carboxylates which can be employed in the process of this invention can be represented by the formula $RCO_2 M$ where R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl, said hdyrocarbyl radical having 1 to about 20 carbon atoms, and M is an alkali metal selected from the group consisting of lithium, sodium, potassium, rubidium and cesium. Preferably, R is an alkyl radical having 1 to about 6 carbon atoms or a phenyl radical and M is lithium or sodium, most preferably lithium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea, and the like, and mixtures thereof.

Applicable bases for use with the sulfur sources discussed hereinafter, other than alkali metal sulfides, are those set forth hereinafter. The quantity of these bases used with each of the after-discussed sulfur sources is specified in each instance. No base need be employed with the alkali metal sulfides and alkali metal bisulfides. However, it is preferable to use a base when the alkli metal bisulfides are employed as sulfur sources.

Bases which can be employed include lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate, cesium carbonate and mixtures thereof. If desired, the hydroxide can be produced in situ by the reaction of the corresponding oxide with water.

One suitable source of sulfur are thiosulfates including those of lithium, sodium, potassium, rubidium, cesium, magnesium, calcium, strontium and barium, and mixtures thereof. When employing thiosulfates as the source of sulfur, the aforementioned base generally will be employed in an amount within the range of from about 1.5 to about 5, and preferably from about 1.8 to about 4, gram-equivalents per gram-mole of thiosulfate. As used in all instances herein, one gram-equivalent of the hydroxides of magnesium, calcium, strontium and barium represents the same amount as one-half gram-mole of these substances, whereas for the hydroxides of lithium, sodium, potassium, rubidium and cesium or for the carbonates of sodium, potassium, rubidium and cesium, the amount represented by one gram-equivalent is considered to be the same as that represented by one gram-mole.

Another suitable source of sulfur are unsubstituted and substituted thioureas represented by the formula

wherein each R is selected from the group consisting of hydrogen and alkyl, cycloalkyl and aryl radicals and combinations thereof such as alkaryl, aralkyl and the like, the number of carbon atoms in each R being within the range of 0 to about 12. Examples of some thioureas which can be employed include unsubstituted thiourea, 1methyl-2-thiourea, 1,3-dimethyl-2-thiourea, 1,3-diethyl-2-thiourea, 1,1,3,3-tetramethyl-2-thiourea, 1,1,3,3-tetraethyl-2-thiourea, 1,3-diisopropyl-1-butyl-2-thiourea, 1-hexyl-3-phenyl-2-thiourea, 1-(3-ethylhexyl)-1-decyl-3-cyclohexyl-2-thiourea, 1,1,3,3-tetradodecyl-2-thiourea, 1,1-dibenzyl-2-thiourea, 1-p-tolyl-2-thiourea, 1-(2-methylcyclopentyl)-3-(cyclopentylmethyl)-2-thiourea and the like, and mixtures thereof.

When employing thioureas as the source of sulfur, the aforementioned bases generally will be employed in an amount within the range of from about 1 to about 6, and preferably from about 2 to about 5, gram-equivalents per gram-mole of thiourea.

Another suitable source of sulfur are thioamides, including acyclic and cyclic thioamides. Thus, thiolactams are included within the scope of operable thioamides. The preferred thioamides for use in this invention can be represented by the formula

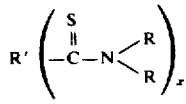

wherein each R is selected from the group consisting of hydrogen and alkyl, cycloalkyl, and aryl radicals, and combinations thereof such as alkaryl, aralkyl and the like; R' is selected from the group consisting of hydrogen and hydrocarbon radicals of valence $x$ selected from saturated hydrocarbon radicals, aromatic hydrocarbon radicals, and combinations thereof such as alkaryl, aralkyl, arylenedialkyl, and the like; and, $x$ is an integer having a value of 1 to 4, with the proviso that when $x = 1$, R' and one R, together, can represent a divalent hydrocarbon radical selected from the group consisting of unsubstituted and alkyl-, cycloalkyl-, and aryl-substituted alkylene, cycloalkylene and arylene radicals, the total number of carbon atoms in said thioamide being within the range of 1 to about 20. The term "thioamide", as employed herein shall serve to designated such materials and to distinguish them from the "organic amides" discussed previously.

Examples of some thioamides can be employed in the process of this invention include thioformamide, N,N-dimethylthioformamide, thioacetamide, N,N-diethylthioacetamide, N-ethylthiopropionamide, N-cyclohexylthiobutyramide, N-isopropyl-N-phenylthiohexanamide, N-p-tolylthiooctanamide, N-benzylthiododecanamide, N-cyclopentylmethyl-N-3-methylcyclopentylthioacetamide, N,N-dibutylthiobenzamide, N-octyl-2-phenylthioacetamide, thio-p-toluamide, N-dodecyl-3-methylthiohexanamide, thioeicosanamide, N-nonadecylthioformamide, thiocyclohexanecarboxamide, 3-cyclopentylthiopropionamide, dithiohexanediamide, N,N'-dimethyldithioterephthalamide, 1,2-bis(thiocarbamoylmethyl)benzene, 1,2,4-tris(thiocarbamoyl)cyclohexane, 1,2,3,4-tetrakis(thiocarbamoyl)butane, 2-azetidinethione, 2-pyrrolidone, 2-piperidinethione, 2-thioxohexamethylenimine, N-methyl-2-pyrrolidinethione, N-isopropyl-3-ethyl-2-piperidinethione, 4-cyclopentyl-2-pyrrolidinethione, 3-phenyl-2-azetidinethione, thiolactam of 2-aminocyclopentanecarbodithioic acid, thiolactam of 2-amino-4-methylcyclooctanecarbodithioic acid, thiolactam of 2-(methylamino)-3-cyclopentylcyclohexanecarbodithioic acid, thiolactam of 2-amino-4-phenylcyclopentanecarbodithioic acid, thiolactam of 2-aminobenzenecarbodithioic acid, thiolactam of 2-(ethylamino)-3-isopropylbenzenecarbodithioic acid, thiolactam of 2-amino-4-cyclohexylbenzenecarbodithioic acid, thiolactam of 2-amino-5-phenylbenzenecarbodithioic acid and the like and mixtures thereof.

When employing thioamides as the source of sulfur, the bases generally will be employed in an amount within the range of from about 1 to about 5, and preferably from about 1.8 to about 4, gram-equivalents per gram-atom of sulfur in the thioamide.

Another suitable source of sulfur is elemental sulfur which can be used in any of its allotropic forms. When employing elemental sulfur as the sulfur source, the base generally will be employed in an amount within the range of from about 1 to about 5, and preferably from about 1.5 to about 4, gram-equivalents per gram-atom of sulfur.

Another suitable source of sulfur is a sulfur-containing compound selected from the group consisting of carbon disulfide and carbon oxysulfide. In this instance, the base generally will be employed in an amount within the range of from about 1 to about 6, and preferably from about 1.5 to about 5, gram-equivalents per gram-atom of sulfur in the carbon disulfide and/or carbon oxysulfide.

Another suitable source of sulfur are thiocarbamates. Thiocarbamates which are preferred for use in the process of this invention can be represented by the formula

wherein each R is selected from hydrogen and R'', R' is selected from alkali metals and R'', R'' is a monovalent hydrocarbyl radical selected from alkyl, cycloalkyl, and aryl, and combinations thereof such as alkaryl, aralkyl, and the like, the number of carbon atoms in said hydrocarbyl radical being within the range of 1 to about 12, and each X is selected from oxygen and sulfur, at least one X being sulfur.

Examples of some thiocarbamates which can be used include lithium thiocarbamate, methyl butyldithiocarbamate, sodium dimethyldithiocarbamate, sodium ethyldithiocarbamate, S-ethyl propylthiocarbamate, O-isopropyl butylthiocarbamate, butyl methylethyldithiocarbamate, hexyl dipenyldithiocarbamate, potassium p-tolythiocarbamate, 2ethylhexyl dibenzyldithiocarbamate, S-decyl dicyclohexylthiocarbamate dodecyl didodecyldithiocarbamate, O-cyclohexyl dihexylthiocarbamate, rubidium (3-ethylpentyl)dithiocarbamate, S-phenyl didecylthiocarbamate, cyclopentylmethyl (cyclopentylmethyl)dithiocarbamate, cesium (3-methylcyclopentyl)thiocarbamate, 4-methylcyclohexyl octyldithiocarbamate, O-benzyl propylisobutylthiocarbamate, m-tolyl diisopropyldithiocarbamate and the like, and mixtures thereof.

When employing thiocarbamates, the base generally will be employed in an amount within the range of from about 1 to about 6, and preferably from about 1.2 to about 4, gram-equivalents per gram-atom of sulfur in the thiocarbamate.

Another suitable source of sulfur are thiocarbamates, including monothiocarbonates and dithiocarbonates, as distinguished from trithiocarbonates hereinafter described. Thiocarbonates which are preferred for use in the process of this invention can be represented by the formula

RXCXR, wherein each R is an alkali metal or a monovalent hydrocarbyl radical selected from alkyl, cycloalkyl, and aryl and combinations thereof such as alkaryl, aralkyl and the like, the number of carbon atoms in said hydrocarbyl radical being within the range of 1 to about 12, at least one R being said monovalent hydrocarbyl radical, and X is selected from oxygen and sulfur, at least one X being oxygen and at least one X being sulfur.

Examples of some thiocarbonates which can be used include lithium methylxanthate, potassium ethylxanthate, methyl isopropylxanthate, ethyl butylxanthate, isobutyl hexylxanthate, cyclohexylmethyl (2-ethylhexyl)xanthate, dodecyl dodecylxanthate, cesium dodecylxanthate, cesium cyclohexylxanthate, heptyl (3-methylcyclopentyl)xanthate, sodium phenylxanthate, benzyl p-tolyxanthate, S,S-diethyl dithiocarbonate, S-methyl S-butyl dithiocarbonate, S-cyclopentyl S-phenyl dithiocarbonate, O,O-dipropyl thiocarbonate, O-ethyl O-isobutyl thiocarbonate, O-(2-methylcyclopentyl) O-benzyl thiocarbonate, O-phenyl S-cyclohexyl thiocarbonate, S-rubidium O-ethyl thiocarbonate and the like and mixtures thereof.

When employing thiocarbonates, the base generally will be employed in an amount within the range of from about 1 to about 6, and preferably from about 1.5 to about 4, gram-equivalents per gram-atom of sulfur in the thiocarbonate.

Another suitable source of sulfur are trithiocarbonates. Trithiocarbonates which are preferred for use in the process of this invention can be represented by the formula

RSCSR, wherein R is an alkali metal or a monovalent hydrocarbyl radical selected from alkyl, cycloalkyl and aryl, and combinations thereof such as alkaryl, aralkyl, and the like, the number of carbon atoms in said hydrocarbyl radical being within the range of 1 to about 12.

Examples of some trithiocarbonates which can be used include lithium trithiocarbonate, sodium trithiocarbonate, potassium trithiocarbonate, rubidium trithiocarbonate, cesium trithiocarbonate, sodium potassium trithiocarbonate, sodium ethyl trithiocarbonate, dimethyl trithiocarbonate, ethyl propyl trithiocarbonate, butyl 2-ethylhexyl trithiocarbonate, isopropyl decyl trithiocarbonate, didodecyl trithiocarbonate, cyclohexyl 3-methylcyclopentyl trithiocarbonate, isobutyl cyclohexylmethyl trithiocarbonate, diphenyl trithiocarbonate, benzyl p-tolyl trithiocarbonate, and the like and mixtures thereof.

When employing the trithiocarbonates, the base generally will be employed in an amount within the range of from about 2 to about 8, and preferably from about 3 to about 6, gram-equivalents per gram-mole of trithiocarbonate.

Another suitable source of sulfur are organic sulfur-containing compounds selected from mercaptans, mercaptides and sulfides having an alpha and/or beta activating substituent represented by the formula

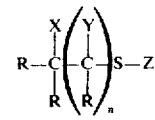

wherein each R is selected from hydrogen and monovalent hydrocarbon radicals selected from alkyl, cycloalkyl, aryl and combinations thereof such as alkaryl, aralkyl, and the like having 1 to about 16 carbon atoms; $n$ is 0 or 1; X and Y are each selected from R and Q, at least one of X and Y being Q, with the proviso that when $n$ is 0, X is Q, and when $n$ is 1 and Y is R, at least one R attached to

is hydrogen; Q is an activating substituent selected from

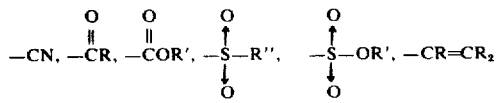

and

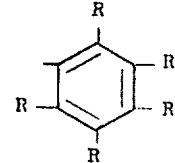

R' being selected from: (a) monovalent hydrocarbon radicals selected from alkyl, cycloalkyl, aryl, and combinations thereof such as alkaryl, aralkyl, and the like, having 1 to about 16 carbon atoms, and, (b) M/$y$, where M is a metal selected from lithium, sodium, potassium, rubidium, cesium, magnesium, calcium, strontium and barium, and $y$ is the valence of the metal M; R" is selected from monovalent hydrocarbon radicals selected from alkyl, cycloalkyl, aryl and combinations thereof such as alkaryl, aralkyl, and the like having 1 to about 16 carbon atoms; Z is selected from hydrogen, M/$y$, and

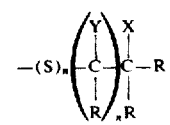

and the total number of carbon atoms in each molecule of each of said organic sulfur-containing compounds is within the range of 1 to about 40.

Some examples of said organic sulfur-containing compounds which can be used in the process of this invention include monosodium salt of mercaptoacetic acid, disodium salt of mercaptoacetic acid, monosodium salt of 2-mercaptopropionic acid, disodium salt of 2-mercaptopropionic acid, monosodium salt of 3-mercaptopropionic acid, disodium salt of 3-mercaptopropionic acid, disodium salt of mercaptosuccinic acid, trisodium salt of mercaptosuccinic acid, p-dodecylbenzyl mercaptan, sodium salt of p-dodecylbenzyl mercaptan, 3-mercaptopropionitrile, (2-mercaptoethyl)benzene, benzyl mercaptan, allyl mercaptan, dilithium salt of 3-cyano-3-mercaptopropionic acid, 2-ethyl-3-mercaptobutyraldehyde, isopropyl 1-mercaptopropyl ketone, cyclohexyl 1-isopropyl-2-mercaptopentyl ketone, methyl 2-butyl-3-mercaptotridecanoate, hexadecyl 2-hexyl-2-mercaptooctadecanoate, potasssium salt of phenyl 2-cyclopentyl-3-mercaptopropionate, methyl α-mercaptobenzyl sulfone, calcium salt of hexyl 2-mercaptoethyl sulfone, cyclooctyl mercaptomethyl sulfone, o-tolyl 1-(mercaptomethyl)hexyl sulfone, dipotassium salt of mercaptomethanesulfonic acid, dicalcium salt of 1-(mercaptomethyl)butanesulfonic acid, methyl 1-mercaptoethanesulfonate, strontium salt of 2,3-dimethyl-5-mercapto-6-phenyl-2-hexane, cesium salt of 2-phenyl-3-mercaptopropene, barium salt of 2-(p-tolyl)ethyl mercaptan, 1-benzyl-2,-(mercaptomethyl)benzene, dibenzyl sulfide, dibenzyl disulfide, diallyl sulfide, bis(2-acetylpropyl) disulfide, bis(1-phenyl-2-nonanoylpentyl) sulfide, bis(1-cyclohexyl-1-p-toluoyl-2-methylpropyl) disulfide, rubidium salt of bis(1-methyl-1,2-dicarboxyoctyl) sulfide, strontium salt of bis (1-carboxy-2-phenylethyl) disulfide, bis(1-ethyl-2-isobutoxycarbonylethyl) sulfide, bis(1-cyclopentyloxycarbonylpentyl) disulfide, bis(2-p-tolyl-2-m-tolyloxycarbonylethyl) sulfide, bis(1-isopropylsulfonylheptadecyl) disulfide, bis(2-hexadecylsulfonylethyl) sulfide bis(1-phenylsulfonylhexyl) disulfide, bis(2-phenyl-2-benzylsulfonylethyl) sulfide, cesium salt of bis(sulfomethyl) disulfide, barium salt of bis(2-sulfopropyl) sulfide, bis(1-heptyloxysulfonylnonyl) disulfide, bis(1-methyl-2-cyclopentyl-2phenoxysulfonylethyl) sulfide, bis(2-nonadecenyl) disulfide, bis[2-(2-isopropyl-5-hexylphenyl)ethyl] sulfide, allyl benzyl disulfide and the like, and mixtures thereof.

When employing this group of organic sulfur-containing compounds, the base generally will be employed in an amount within the range of from about 1.1 to about 5, and preferably from about 1.5 to about 3, gram-equivalents per gram-atom of divalent sulfur in the organic sulfur-containing compound, with the proviso that when the organic sulfur-containing compound is employed as a metal mercaptide, the base requirement is reduced by one gram-equivalent per gram-atom of divalent sulfur in the metal mercaptide.

Another suitable source of sulfur is phosphorus pentasulfide.

When using phosphorus pentasulfide as the sulfur source, the base generally will be used in an amount within the range of about 5 to about 25, preferably about 9 to about 20, gram-equivalents per gram-mole of phosphorus pentasulfide.

Another suitable source of sulfur are alkali metal bisulfides and particularly the bisulfides of lithium, sodium, potassium, rubidium, cesium and mixtures thereof, in anhydrous form or as hydrates. As previously mentioned, when alkali metal bisulfides are employed, no base need be used, in which case the alkali metal bisulfide is employed in an amount within the range of from about 0.8 to about 1.5 gram-moles per gram-mole of p-dihalobenzene.

If a base is used, the base will be employed in an amount within the range of from about 0.3 to about 4, and preferably from about 0.4 to about 2, gram-equivalents per gram-mole of alkali metal bisulfide. When a base is thus used, the ratio of p-dihalobenzene to sulfur source will be as shown hereinafter.

Another suitable source of sulfur are alkali metal sulfides represented by the formula $M_2S$ wherein M is an alkali metal selected from the group consisting of sodium, potassium, lithium, rubidium and cesium. The applicable alkali metal sulfides include the monosulfides in anhydrous and hydrated forms. The preferred sulfide is sodium sulfide.

When alkali metal sulfides are employed as the sulfur source, a base is not required.

Although the ratio of reactants can vary considerably, the ratio of gram-moles of p-dihalobenzene to gram-atoms of divalent sulfur in the sulfur source, except when the sulfur source is elemental sulfur, should be within the range of from about 0.8 to about 2, and preferably from about 0.95 to about 1.3, except as previously shown for the use of alkali metal bisulfides in the absence of base as herein described. When elemental sulfur is used as the sulfur source, the ratio of gram-moles of p-dihalobenzene to gram-atoms of sulfur should be within the range of from about 0.8 to about 2, preferably about 0.82 to about 1. The gram-moles of alkali metal carboxylate per gram-mole of p-dihalobenzene should be within the range of from about 0.05 to about 4 and preferably from about 0.1 to about 2. The grams of organic amide per gram-mole of p-dihalobenzene should be within the range of from about 100 to about 2500.

The components used in the preparation of the p-phenylene sulfide polymer can be introduced into contact in any order. Water which can be present in any composite formed from any of the components or wich can be present in any of the individual components can be removed, for example, by distillation, prior to conducting the polymerization reaction. In other words, water can be substantially absent at the beginning of the polymerization reaction or it can be present as free water and/or as water of hydration in an amount up to about 1 gram-mole per gram-mole of p-dihalobenzene. If desired, dehydration steps can be employed to bring the amount of water present within the above limit. Regardless of whether a water removal step is employed, at least a portion of the composition formed from the p-dihalobenzene, the sulfur source, the alkali metal carboxylate, the organic amide, and the base, if used, is maintained at polymerization conditions to produce the p-phenylene sulfide polymer.

The temperature at which the polymerization can be conducted can vary over a wide range and will generally be within the range of from about 235°C to about 450°C, and preferably from about 240°C to about 350°C, with the exception that when the alkali metal carboxylate is a sodium, potassium, rubidium, or cesium salt of an aromatic carboxylic acid, i.e., an acid in which the carboxy group is attached directly to an aromatic nucleus, the temperature should be within the range of from about 255°C to about 450°C, preferably from about 260°C to about 350°C. The reaction time will be within the range of from about 10 minutes to about 3 days and preferably about 1 hour to about 8 hours. The pressure need be only sufficient to maintain the p-dihalobenzene and the organic amide substantially in the liquid phase, and to retain the sulfur source therein.

The p-phenylene sulfide polymer produced by the process of this invention can be separated from the reaction mixture by conventional procedures, for example, by filtration of the polymer followed by washing with water, or by dilution of the reaction mixture with water, followed by filtration and water washing of the polymer.

The p-phenylene sulfide polymer prepared by the process of this invention can be blended with fillers, pigments, extenders, other polymers and the like. It can be cured through crosslinking and/or chain extension, for example, by heating at temperatures up to about 480°C in the presence of a free oxygen-containing gas to provide cured products having high thermal stability and good chemical resistance. It is useful in the production of coatings, films, molded objects, and fibers.

The p-phenylene sulfide polymers produced by the process of this invention are particularly useful in the preparation of fibers having desirable properties, including high tenacity. When used for this purpose, it is desirable that the polymer have a melt flow (ASTM D 1238-70, modified to a temperature of 600°F using a 5-kg weight, value expressed as g/10 min) within the range of from about 50 to about 700. Surprisingly, a p-phenylene sulfide polymer in which at least about 90 percent of the recurring p-phenylene sulfide units are unsubstituted, which can be produced through use of selected lithium carboxylates, for example, lithium acetate or lithium benzoate, under selected conditions, as hereinafter discussed, has a melt flow within the above range, and the polymer can be melt spun directly into fibers having desirable properties without prior curing of the polymer. When the p-phenylene sulfide polymer is produced through use of other lithium carboxylates or of the carboxylates of sodium, potassium, rubidium or cesium, or through use of a mixture of p-dihalobenzenes containing about 10 to 50 mole percent hydrocarbyl-substituted p-dihalobenzene, it is desirable that the polymer, prior to spinning, be partially cured to reduce the melt flow of the polymer to a value within the above range. Preferably, this partial curing is achieved by heating the polymer in air at a temperature within the range of from about 200°C to about 280°C for a period within the range of from about 10 minutes to about 24 hours to achieve the desired degree of crosslinking and/or chain extension. The polymer of desirable melt flow can then be melt extruded by means of conventional melt spinning equipment by passing the polymer melt through a spinneret at a temperature above the melting point of the polymer, preferably within the range of about 280°C to about 310°C. Following spinning, the fibers can be drawn in the solid state to produce a high degree of orientation. This step can be carried out at ambient temperature or preferably at an elevated temperature below the melting point of the polymer, more preferably at about 90°C to about 110°C. The filaments can be drawn from about three to about five times their original length, thus producing an oriented filament.

Alternatively, the p-phenylene sulfide polymer in which at least about 90 percent of the recurring p-phenylene sulfide units are unsubstituted and which is produced under the conditions set forth below can be melt-pressed, without prior curing, into tough, flexible films which are transparent, if quenched, and ductile.

Poly(p-phenylene sulfide), i.e., p-phenylene sulfide polymer in which the recurring p-phenylene sulfide units are unsubstituted, in the uncured state having an inherent viscosity of at least about 0.25, and generally within the range of from about 0.25 to about 0.34, and even as high as 0.35 or higher, determined at 206°C in 1-chloronaphthalene at a polymer concentration of 0.4 g/100 ml solution, suitable for the production of the mentioned fibers and films, the poly(p-phenylene sulfide) not requiring curing prior to spinning or film formation, is produced employing p-dichlorobenzene as the p-dihalobenzene and an alkali metal sulfide, preferably sodium sulfide, as the source of sulfur. The alkali metal carboxylate should have the formula $RCO_2 M$ wherein R is an alkyl radical having 1 to about 6 carbon atoms or a phenyl radical and M is lithium. If desired, the carboxylate can be employed as a hydrate. The organic amide should be N-methyl-2-pyrrolidone. The p-dichlorobenzene will be employed in an amount within the range of from about 0.95 to about 1.1 gram-moles per gram-atom of sulfur in the alkali metal sulfide. The lithium carboxylate should be employed in an amount within the range of from about 0.5 to about 2 gram-moles per gram-mole of the p-dichlorobenzene. The N-methyl-2-pyrrolidone should be employed in an amount within the range of from about 100 to about 2500 grams per gram-mole of p-dichlorobenzene. The polymerization should be carried out at a temperature within the range of from about 250°C to about 280°C and preferably within the range of about 255°C to about 275°C. The reaction time should be within the range of from about 1 hour to about 3 days and preferably from about 2 hours to about 8 hours. There should be present substantially no free water or water of hydration, so a dehydration step should be employed prior to conducting the polymerization, preferably, although not necessarily, before addition of the p-dichlorobenzene. Poly(p-phenylene sulfide) thus prepared can be spun, e.g., at about 280°C, and drawn, e.g., at about 100°C to about 110°C, at a draw ratio of about 4X, without prior curing, into fibers having a tenacity of at least about 1 gram per denier (gpd), determined by the method of ASTM D 2256–69, using an optional rate of elongation of 100 percent per minute. Similarly, p-phenylene sulfide polymers suitable for spinning or film formation without prior curing and in which up to about 10 percent of the recurring p-phenylene sulfide units are hydrocarbyl-substituted can be produced by replacing up to about 10 mole percent of the p-dichlorobenzene with a hydrocarbyl-substituted p-dichlorobenzene within the scope of the p-dihalobenzenes hereinbefore described, the polymerization, spinning, and drawing conditions otherwise being as described in this paragraph.

The following examples provide the basis for the foregoing statements.

EXAMPLES

In the following examples, values for glass transition temperatures (Tg) and crystalline melting point (Tm) were determined by differential thermal analysis. Values for inherent viscosity were determined at 206°C in 1-chloronaphthalene at a polymer concentration of 0.4 g/100 ml solution. Melt flow values were determined by the method of ASTM D 1238-70, modified to a temperature of 600°F using a 5-kg weight, the value being expressed as g/10 min. Throughout the examples the expression "mol(s)" or "mole(s)" is intended to mean "gram-mole(s)."

EXAMPLE I

This is a control run in which poly(p-phenylene sulfide) was prepared according to the method of U.S. Pat. No. 3,354,129.

To a stirred autoclave was charged 127.2 g (1.0 mole, 61.5% assay) sodium sulfide and 276.7 g of N-methyl-2-pyrrolidone (NMP). The mixture was heated under a slow $N_2$ flush to 202°C in 2 hours and 5 minutes. The distillate (32 ml) contained 22.7 g of water. The reactor was cooled to 175°C and a solution of 149.9 g (1.02 moles) of 1,4-dichlorobenzene (DCB) in 50 g of NMP was added. The system was closed off under 20 psig nitrogen pressure and heated to 245°C in 20 minutes.

After heating 3 hours at 245°C and a pressure within the range of 60 to 145 psig, the reactor was cooled to room temperature.

The product was a dark gray solid which was washed seven times with 1-liter portions of hot water and dried at 80°C in a vacuum oven.

The yield was 101.4 grams (94%) of poly(p-phenylene sulfide) having an inherent viscosity of 0.16, a Tg of 83°C and a Tm of 283°C.

EXAMPLE II

This is a control run in which poly(p-phenylene sulfide) was prepared according to the method of U.S. Pat. No. 3,354,129 but under slightly different conditions from those employed in Example I.

A reaction mixture similar to that of Example I was prepared and dehydrated by heating for 1 hour and 40 minutes while increasing the temperature up to 205°C. 30 ml of distillate containing 27.0 g of water were recovered.

The solution of DCB was charged when the reaction mixture was at a temperature of 205°C. and the mixture was heated to 245°C. in 10 minutes. After 3 hours at 245°C., during which period the pressure was within the range of 70 to 130 psig, the reactor was cooled to room temperature.

The dark gray product was washed with hot water eight times and dried at 80°C. in a vacuum oven.

The yield was 100.0 g (92%) of poly(p-phenylene sulfide) having an inherent viscosity of 0.18, a Tg of 85°C. and a Tm of 286°C.

Examples III to XI illustrate the use of various alkali metal acetates under conditions within the scope of the invention. The poly(p-phenylene sulfide) produced in each of these examples was of higher inherent viscosity than that obtained from either Example I or Example II.

EXAMPLE III

The reactor was charged as in Example I except that 13.6 g (0.10 mol) of sodium acetate trihydrate ($CH_3COONa.3H_2O$) was included. Dehydration was conducted by heating for 1 hour and 50 minutes to 205°C. to yield 22 ml of distillate containing 22 g of water. DCB was charged as in Example I and a similar polymerization at a pressure within the range of 65 to 125 psig yielded a light gray product. The product was washed three times in hot water and dried in a vacuum oven at 80°C.

The yield was 101.6 g (94%) of poly(p-phenylene sulfide) having an inherent viscosity of 0.19, a Tg of 84°C. and a Tm of 285°C.

EXAMPLE IV

The reactor was charged as in Example I except that 68.0 g (0.5 mol) of sodium acetate trihydrate was included. Dehydration was conducted by heating for 2 hours and 50 minutes to 202°C. to yield 51 ml of distillate containing 44.7 g of water. DCB was charged as in Example I and a similar polymerization at a pressure within the range of 65-130 psig yielded a dark gray product. The product was washed 7 times in hot water and dried in a vacuum oven at 80°C.

The yield was 97.2 g (89.8%) of poly(p-phenylene sulfide) having an inherent viscosity of 0.20, a Tg of 82°C. and a Tm of 284°C.

EXAMPLE VI

The reactor was charged as in Example I except that 136.1 g (1.0 mol) of sodium acetate trihydrate was included. Dehydration by heating for two hours and 15 minutes at a temperature up to 200°C. yielded 78 ml of distillate containing 72.2 g of water. DCB was charged as in Example I and a similar polymerization at a pressure within the range of 80 to 130 psig yielded a gray product. The product was washed with 1-liter portions of hot water seven times and dried at 80°C. in a vacuum oven. The yield was 95.6 g (88%) of poly(p-phenylene sulfide) having an inherent viscosity of 0.23, a Tg of 83°C, and a Tm of 283°C.

EXAMPLE VI

The reactor was charged as in Example I except that 204.2 g (1.5 mols) of sodium acetate trihydrate was included. Dehydration, conducted by heating for 2 hours and 30 minutes up to a temperature of 202°C., yielded 107 ml of distillate containing 102.9 g of water. DCB was charged as in Example I and a similar polymerization at a pressure within the range of 60–115 psig was conducted to yield a light gray product.

The product was washed with 1-liter portions of hot water six times and dried at 80°C. in a vacuum oven. The yield was 91.6 g (85%) of poly(p-phenylene sulfide) having an inherent viscosity of 0.20, a Tg of 81°C. and a Tm of 285°C.

EXAMPLE VII

The reactor was charged as in Example II except that 136.1 g (1.0 mol) of sodium acetae trihydrate was included. Dehydration, conducted by heating for 1 hour and 25 minutes up to a temperature of 205°C., yielded 89 ml of a distillate containing 76.2 g of water. DCB in an amount of 147.0 g (1.0 mol) was charged as in Example II and a similar polymerization at a pressure within the range of 60–100 psig yielded a gray product.

The product was washed with 1-liter portions of hot water six times and dried at 80° C. in a vacuum oven. The yield was 96.6 g (89%) of poly(p-phenylene sulfide) having an inherent viscosity of 0.22, a Tg of 83°C. and a Tm of 287°C.

EXAMPLE VIII

The reactor was charged as in Example II except that 129.5 g (1.02 mols, 61.5% assay) of sodium sulfide was used and 136.1 g (1.0 mol) of sodium acetate trihydrate was included. Dehydration by heating for 1 hour and 40 minutes at temperatures up to 205° C. yielded 90 ml of distillate containing 81.7 g of water. DCB in the amount of 147.0 g (1.0 mol) was charged as in Example II and a similar polymerization at a pressure within the range of 50–105 psig yielded a gray product. The product was washed in 1-liter portions of hot water six times and dried at 80° C. in a vacuum oven. The yield was 95.9 g (88.6%) of poly(p-phenylene sulfide) having an inherent viscosity of 0.22, a Tg of 80° C. and a Tm of 285° C.

EXAMPLE IX

The reactor was charged as in Example II except that 136.1 g (1.0 mol) of sodium acetate trihydrate was included. Dehydration was conducted by heating for 2 hours and 15 minutes up to 205° C. and yielded 86 ml of distillate containing 79.1 g of water. DCB was charged as in Example II and a similar polymerization conducted for 4 hours at 245° C. at a pressure within the range of 55 to 105 psig yielded a gray product. The product was washed in 1-liter portions of hot water eight times and dried at 80° C. in a vacuum oven. The yield was 95.7 g 88.5%) of poly(p-phenylene sulfide) having an inherent viscosity of 0.24, a melt flow of 1295, a Tg of 87°C and a Tm of 285°C. This material had a melt flow of 1295 (ASTM D 1238-70, modified to a temperature of 600°F using a 5-kg weight, value expressed as g/10 min) in the absence of curing while that polymer of Example II had a melt flow in excess of 6000 in the absence of curing. To obtain a melt flow of about 1295, prior art poly(p-phenylene sulfide) must be partially cured.

EXAMPLE X

The reactor was charged as in Example II except that 98.15 g (1.0 mol) of potassium acetate was included. Dehydration by heating for 1 hour and 55 minutes at temperatures up to 205° C. yielded 32 ml of distillate containing 29.5 g of water. DCB was charged as in Example II and a similar polymerization at a pressure within the range of from 50 to 95 psig yielded a dark gray product. The product was washed 8 times with 1-liter portions of hot water and dried in a vacuum oven at 80° C. The yield was 99.1 g (92%) of poly(p-phenylene sulfide) having an inherent viscosity of 0.20, a melt flow of 3500, a Tg of 83°C and a Tm of 287°C.

EXAMPLE XI

To a stirred autoclave were charged 63.6 g (0.5 mol) of sodium sulfide (61.5% assay), 123.3 g of NMP and 51.0 g (0.5 mol) of lithium acetate dihydrate. The contents were dehydrated by heating 2 hours and five minutes, the dehydration yielding 31 ml of distillate containing 27.8 g of water. DCB in the amount of 74.95 g (0.51 mol) was charged as in Example II and a similar polymerization at a pressure within the range of 75–100 psig yielded a dark gray product. The product was washed eight times with 1-liter portions of water and dried in a vacuum oven at 80° C. The yield was 49.9 g (90%) of poly(p-phenylene sulfide) having an inherent viscosity of 0.20, a melt flow of 2460, a Tg of 83°C and a Tm of 288°C.

Examples XII to XIV demonstrate that the use of certain acetates, specifically, calcium acetate, cupric acetate and ammonium acetate, does not improve the polymer properties and, in fact, produces a less desirable polymer.

EXAMPLE XII

The reactor was charged as in Example II except that 88.1 g (0.5 mol) of calcium acetate monohydrate was included. Dehydration (1 hour and 25 minutes to 190° C.) yielded 26 ml of distillate containing 21.8 g of water. DCB was charged as in Example II and a similar polymerization was conducted at a pressure within the range of 85–95 psig. The product was light colored. The product was washed eight times in 1-liter portions of hot water and dried at 80° C. in a vacuum oven. The yield was 91.1 g (84%) of poly(p-phenylene sulfide) containing 16.4 weight percent ash. The polymer had an inherent viscosity of 0.07, a Tg of 75° C. and a Tm of 288° C.

EXAMPLE XIII

The reactor was charged as in Example II except that 99.8 g (0.5 mol) of cupric acetate monohydrate was included. Dehydration (1 hour and 45 minutes to 199°C.) yielded 61 ml of distillate containing 49.4 g of water. DCB was charged as in Example II and a similar polymerization at a pressure within the range of 70–95 psig was conducted and yielded a black product. The product was washed twice in 1-liter portions of hot water, 8 times in 1-liter portions of methanol, and 3 times in l-liter portions of water and dried in a vacuum oven at 80° C. The yield was 71.7 g (66%) of an insoluble product containing 74 weight percent ash, and having a Tg of 74° C. and a Tm of 266° C.

EXAMPLE XIV

The reactor was charged as in Example II except that 77.1 g (1.0 mol) of ammonium acetate was included. Dehydration (2 hours and 5 minutes to 200° C.) yielded 50 ml. of distillate containing 40.3 g of water. DCB was charged as in Example II and a similar polymerization at a pressure within the range of 80 to 160 psig yielded a multi-colored product. The product was washed six times with 1-liter portions of water and twice with 1-liter portions of methanol and dried in a vacuum oven at 80° C. The yield was 56 g (52%) of poly(p-phenylene sulfide) having an inherent viscosity of 0.07, a Tg of 65° C. and a Tm of 270° C.

Examples XV to XVIII illustrate the use of other temperatures and some alkali metal carboxylates. Example XIX is a control run outside the scope of this invention employing a temperature of 265° C. in which the polymer produced had a lower inherent viscosity than that obtained in Example XV, XVI. or XVII.

EXAMPLE XV

To a stirred autoclave were charged 127.2 g (1.0 mol, 61.5% assay) of sodium sulfide, 136.1 g (1.0 mol) of sodium acetate trihydrate and 276.7 g of NMP. Dehydration (1 hour and 25 minutes to 206° C.) yielded 85 ml of distillate containing 72.0 g of water. A solution of 149.9 g (1.02 mols) of DCB in 50 g of NMP was added and the system heated under nitrogen pressure to 265° C. in 20 minutes. After heating at 265° C. for 3 hours (pressure 70-130 psig) the mixture was cooled to room temperature. The product (dark gray solid) was washed ten times in 1-liter portions of hot water and dried in a vacuum oven at 80° C. The yield was 95.6 g (88% yield) of poly(p-phenylene sulfide) having an inherent viscosity of 0.26, a melt flow of 870, a Tg of 87° C and a Tm of 285°C.

EXAMPLE XVI

To a stirred autoclave were charged 127.2 g (1.0 mol, 61.5% assay) of sodium sulfide, 96.1 g (1.0 mol) of sodium propionate, 54.0 g (3.0 mols) of water and 276.7 g of NMP. Dehydration (1 hour and 35 minutes to 208° C.) yielded 83 ml of distillate containing 75.0 g of water. DCB was charged as in Example XV and the mixture was heated to 265° C. in 20 minutes. A similar polymerization (pressure 75-130 psig) yielded a black product which was washed 11 times with 1-liter portions of hot water and dried in a vacuum oven. The yield was 87.4 g (81%) of poly(p-phenylene sulfide) having an inherent viscosity of 0.28, a melt flow of 4700, a Tg of 85°C and a tm of 286°C.

EXAMPLE XVII

To a stirred autoclave were charged 63.6 g (0.5 mol, 61.5% assay) sodium sulfide, 51.0 g (0.5 mol) of lithium acetate dihydrate, 123.3 g of NMP and 9.0 g (0.5 mol) of water. Dehydration (1 hour and 20 minutes to about 205°C.) yielded 29 ml of distillate containing 25.7 g of water. DCB (74.95 g, 0.51 mol) in NMP (40 g) was charged as in Example XV and a similar polymerization at 265° C. (pressure 70-115 psig) for 3 hours was carried out. The product was washed eight times with 1-liter portions of hot water. The yield was 46.7 g. (86% yield) of poly(p-phenylene sulfide) having an inherent viscosity of 0.34, a melt flow of 300, a Tg of 90°C and a Tm of 284°C.

EXAMPLE XVIII

A polymerization comparable to that of the Run XVII was carried out except that the polymerization temperature was 285° C. The yield was 47.2 g (87.3% yield) of poly(p-phenylene sulfide) having an inherent viscosity of 0.21, a melt flow of 1000, a Tg of 87°C and a Tm of 286°C.

EXAMPLE XIX

To a stirred autoclave were charged 172.2 g (1.0 mol, 61.5% assay) of sodium sulfide and 276.7 g of NMP. Dehydration (1 hour and 35 minutes to 215°C.) yielded 27 ml of distillate containing 24.5 g of water. DCB (149.9 g, 1.02 mols) in 50 g of NMP was charged and the reaction mixture was closed off under 20 psig nitrogen and heated to 265° C. in 10 minutes. After heating for three hours (pressure 75-150 psig) the reactor was cooled to room temperature and the polymer was recovered.

The product was washed nine times in 1-liter portions of hot water and dried in a vacuum oven at 80° C. There was recovered 107.0 g (99% yield) of poly(p-phenylene sulfide) having an inherent viscosity of 0.14, a Tg of 85° C. and a Tm of 289° C.

EXAMPLE XX

Three polymers, each poly(p-phenylene sulfide), were produced, and their properties as filament were compared, with prior curing when desired.

The first polymer was poly(p-phenylene sulfide) produced by the method of U.S. Pat. No. 3,354,129, employing 1,4-dichlorobenzene, sodium sulfide and N-methyl-2-pyrrolidone, without the use of an alkali metal carboxylate.

The second polymer was produced employing the same materials and in accordance with the method of this invention, there being included in the reaction mixture one mole of sodium acetate trihydrate per mole of sodium sulfide. This polymer was made by dehydrating a mixture prepared from 955 g (7.5 moles) hydrated sodium sulfide, 1020 g (7.5 moles) sodium acetate trihydrate and 2565 g NMP, followed by addition of 1128 g (7.67 moles) DCB in 513 g NMP, the polymerization then being conducted at 246° C. for four hours at 30-70 psig.

The third polymer was produced employing those materials employed in producing the first polymer and in accordance with the method of this invention, there being included in the reaction mixture one mole of lithium acetate per mole of sodium sulfide. The preparation of this polymer is described in Example XVII.

Values of inherent viscosities of the polymers were determined prior to curing. Values of melt flow (ASTM D 1238-70, modified to a temperature of 600° F. using a 5-kg weight, value expressed as g/10 min) were determined on the polymers after curing, except for the above third polymer, whose melt flow was determined without prior curing.

The first and second polymers and the uncured third polymer were all then individually melt spun into monofilaments employing a one hole, 20 × 50 mil spinneret, and drawn at a ratio of about 4X. The resulting filaments were then tested for tenacity, elongation and initial modulus (ASTM D 2256-69, using an optional rate of elongation of 100 percent per minute). These data are presented in Table I. The data indicate that the third poly(p-phenylene sulfide), produced employing lithium acetate, did not require curing prior to being spun and drawn to produce a fiber of exceptional properties. The uncured poly(p-phenylene sulfide) produced through the use of lithium acetate and the cured poly)p-phenylene sulfide) produced through use of sodium acetate were superior to the cured poly(p-phenylene sulfide) produced in the absence of an alkali metal carboxylate, particularly as indicated by the values for tenacity. Especially outstanding in this respect was the uncured poly(p-phenylene sulfide) produced employing lithium acetate.

Table I

| | | Filament Production and Properties | | | | | | | | |
|---|---|---|---|---|---|---|---|---|---|---|
| | | (After Cure) | 260°C Cure | (Before | \multicolumn{3}{c}{Filament Formation} | | \multicolumn{3}{c}{Filament Tests} | | |
| Polymer | Acetate Added | Melt Flow | Time, Hr. | Cure) I.V. | Spin Temp,°C | Draw Temp,°C | Draw Ratio | Denier | Ten.,gpd | Elong.,% | I.M.,gpd |
| 1 | None | 490 | 0.5 | 0.17 | 290 | 100 | 4X | 28 | 1.8 | 27 | 40 |
| 2 | Sodium Acetate | 585 | 2 | 0.18 | 285 | 100 | 4.3X | 22 | 3.0 | 25 | 48 |

Table I-continued

| | | Filament Production and Properties | | | | | | | | |
|---|---|---|---|---|---|---|---|---|---|---|
| | | | | | Filament Formation | | | | | |
| | | (After Cure) | 260°C Cure | (Before | Spin | Draw | Draw | | Filament Tests | |
| Polymer | Acetate Added | Melt Flow | Time, Hr. | Cure) I.V. | Temp.,°C | Temp.,°C | Ratio | Denier | Ten.,gpd | Elong.,% | I.M.,gpd |
| 3 | Lithium Acetate | 300 (uncured) | None | 0.34 | 280 | 100 | 4X | 20 | 4.3 | 24 | 52 |

I.V. — Inherent viscosity.
Ten. — Tenacity.
Elong. — Elongation.
I.M. — Initial modulus.

The following example illustrates the advantageous use of sodium acetate with sodium bisulfide as the sulfur source.

EXAMPLE XXI

To a stirred autoclave were charged 83.6 g (1.0 mol, 67% assay) sodium bisulfide, 136.1 g (1.0 mol) of sodium acetate trihydrate (NaOAc.3H₂O) and 276.7 g of NMP. Dehydration was carried out for 1 hour and 30 minutes to 194° C. and yielded 89 ml. of distillate containing 74.7 g of water. The reactor was cooled to 175° C. and a solution of 149.9 g (1.02 mols) of DCB in 50 g of NMP was added. The system was closed off under 20 psig N₂ and heated to 245° C. in 20 minutes, and the mixture was maintained at 245° C. for 3 hours at a pressure within the range of 100–180 psig. The yellow product was washed four times with 1-liter portions of hot water and two times with 1-liter portions of methanol. The product was dried at 50° C. in a vacuum oven. A yield of 57.4 g (53%) of poly(p-phenylene sulfide) having an inherent viscosity of 0.04, a Tg of 52° C. and a Tm of 268° C. was recovered.

For comparative purposes, a polymerization conducted under comparable conditions but excluding the use of sodium acetate yielded 43.1 g (40%) of poly(p-phenylene sulfide) having an inherent viscosity of 0.03, a Tg of 57° C. and a Tm of 258° C. Thus, the inherent viscosity of the polymer was greater when sodium acetate was employed.

The following Examples XXII and XXIII illustrate the benefit derivable from the use of sodium acetate with N-methyl-2-pyrrolidinethione (NMPT) as the sulfur source.

EXAMPLE XXII

To a stirred autoclave were charged 163 g (4.0 mols, 97% assay) of NaOH, 200 ml of water and 500 g of NMP. The system was heated under a N₂ flush to 200° C. in three hours and 24 minutes and 190 ml. of distillate was collected. A mixture of 230 g (2.0 moles) of NMPT and 298 g (2.03 mols) of DCB was added and the resulting mixture was closed off under 150 psig N₂. The mixture was heated to 250° C. in 41 minutes and maintained at that temperature for three hours under a pressure between 170 and 200 psig. The contents of the autoclave were cooled to room temperature. The polymer was recovered, and washed and dried in the usual manner.

There was recovered 189 g (87.5% yield) of poly(p-phenylene sulfide) having an inherent viscosity of 0.11.

EXAMPLE XXIII

To a stirred autoclave were charged 163 g (4.0 mols, 97% assay) of NaOH, 200 ml. of water, 616 g of NMP and 136 g (1.0 mol) of NaOAc.3H₂O. Dehydration was conducted for 1 hour and 53 minutes to a temperature of 200° C. and yielded 235 ml. of distillate. A mixture of 230 g (2.0 mols) of NMPT and 300 g (2.02 mols) of DCB was added to the autoclave and the system was closed off under 190 psig N₂ and heated to 250° C. in 30 minutes. After heating three hours at 250° C. at a pressure within the range of 210–230 psig, the autoclave was cooled to room temperature. The polymer was recovered and washed and dried in the usual manner.

There was recovered 161 g (75% yield) of poly(p-phenylene sulfide) having an inherent viscosity of 0.17.

Thus, the inherent viscosity of the polymer was much greater than that of the polymer produced in Example XXII.

EXAMPLE XXIV

The following illustrates the effect of sodium acetate in the preparation of high molecular weight poly(p-phenylene sulfide) from carbon disulfide or from elemental sulfur as the sulfur source.

In all instances, the preparation of the polymers was conducted according to the methods of the foregoing examples with the exception that a different sulfur source and sodium acetate were added as indicated, sodium acetate sometimes being formed in situ. In each instance approximately 327 g of NMP was employed per 1.03 moles DCB, and the dehydration step was followed by polymerization at 246° C. for 3 hours. In Tables II, III and IV polymer yields are based on the theoretical production of 108 g of poly(p-phenylene sulfide) from each mole of DCB employed.

Results were as follows:

Table II

Sodium Acetate and Carbon Disulfide. Mol Ratio of CS₂ to NaOH to DCB of 0.50 to 3.0 to 1.03, Respectively

| Sodium Acetate, Mol per 1.03 Mols DCB | Method of NaOAc Addition | Polymer Yield, % | Inherent Viscosity | Tm, °C | Ash, Weight % |
|---|---|---|---|---|---|
| 0 | — | 90 | 0.12 | | 1.8 |
| 0.10 | Salt at beginning[a] | 92 | 0.13 | | 0.63 |
| 0.25 | Salt at beginning[a] | 89 | 0.17 | | 1.1 |
| 0.50 | Salt at beginning[a] | 89 | 0.20 | 286 | 0.67 |
| 0.50 | In situ formation[b] | 88 | 0.21 | | 0.66 |

[a]Salt in form of NaOAc.3H₂O introduced into reaction mixture at beginning.
[b]0.50 mol extra NaOH and 0.50 mol 99.7% glacial acetic acid introduced into reaction mixture at beinning.

The data of Table II illustrate that using carbon disulfide the presence of sodium acetate improved inherent viscosity of the poly(p-phenylene sulfide) and tended to lower ash content.

Comparable data employing sodium acetate and elemental sulfur as the sulfur source for poly(p-phenylene sulfide) prepared in accordance with the methods of the foregoing examples are shown in Tables III and IV.

Table III

Sodium Acetate and Elemental Sulfur. Ratio of S (Gram-Atoms) to NaOH (Mols) to DCB (Mols) of 1.125 to 2.81 to 1.03, Respectively

| Sodium Acetate, Mol per 1.03 Mols DCB | Method of NaOAc Addition | Polymer Yield, % | Inherent Viscosity | Ash, Weight % |
|---|---|---|---|---|
| 0 | — | 75 | 0.07 | 1.7 |
| 0.25 | Salt at beginning[a] | 79 | 0.11[b] | 1.2 |
| 0.50 | Salt at beginning[a] | 75 | Insoluble | 0.93 |
| 0.50 | Salt and DCB at beginning[a×c] | 67 | Insoluble | 1.5 |
| 0.50 | 0.5 mol extra NaOH and 0.50 mol 99.7% glacial acetic acid at beginning | 81 | 0.10 | 0.80 |
| 0.50 | As salt dissolved in 75 ml. water after heating charge to 300°F.[a] | 80 | 0.10 | 0.69 |
| 0.50 | As salt dissolved in 75 ml. water at beginning[a] | 85 | 0.09 | 0.58 |

[a]Salt used was NaOAc.3H$_2$O.
[b]Dissolved, filtered and reprecipitated portion of product.
[c]DCB which distilled over during dehydration was reintroduced into autoclave.

Table IV

Sodium Acetate and Elemental Sulfur. Ratio of S (Gram-Atoms) to NaOH (Mols) to DCB (Mols) of 1.19 to 2.98 to 1.03, Respectively

| Sodium Acetate, Mol per 1.03 Mols DCB | Method of NaOAc Addition | Polymer Yield, % | Inherent Viscosity | Ash, Weight % |
|---|---|---|---|---|
| 0 | — | 79 | 0.07 | 2.1 |
| 0.50 | 0.50 mol extra NaOH and 0.50 mol 99.7% glacial acetic acid at beginning | 77 | 0.11 | 0.87 |

The data in Tables III and IV show that using elemental sulfur the presence of sodium acetate improved the inherent viscosity of the poly(p-phenylene sulfide) and tended to lower ash content.

EXAMPLE XXV

This is a control run in which poly(p-phenylene sulfide) was prepared in accordance with the method of U.S Pat. No. 3,354,129.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), and 158.3 g NMP. Dehydration of the mixture by heating to 205°C yielded 16 ml of distillate containing 14.3 g water. To the residual mixture were charged 74.95 g (0.51 mole) DCB and 40 g NMP. The resulting mixture was heated for 3 hours at 265°C at a pressure of 75-130 psig. The reaction product was washed eight times with hot water and dried at 80°C under nitrogen in a vacuum oven to obtain a yield of 51.1 g (94.5%) poly(p-phenylene sulfide) having an inherent viscosity of 0.18, a melt flow of 3840, a Tg of 84°C, and a Tm of 285°C.

EXAMPLE XXVI

This run demonstrates the use of lithium benzoate in the preparation of poly(p-phenylene sulfide).

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 64.03 g (0.5 mole) lithium benzoate, and 158.3 g NMP. Dehydration of the mixture by heating to 205°C yielded 15 ml of distillate containing 14.1 g water. To the residual mixture were charged 74.95 g (0.51 mole) DCB and 40 g NMP. The resulting mixture was heated for 3 hours at 265°C at a pressure of 75-115 psig. The reaction product was washed eight times with hot water and dried at 80°C under nitrogen in a vacuum oven to obtain a yield of 46.3 g (85.5%) poly(p-phenylene sulfide) having an inherent viscosity of 0.34, a melt flow of 118, a Tg of 89°C, and a $T_m$ of 281°C.

Thus, based on inherent viscosity and melt flow, the above polymer produced through use of lithium benzoate was of much higher molecular weight than that obtained in the control run (Example XXV) employing no benzoate.

EXAMPLE XXVII

This run demonstrates the use of lithium benzoate in a polymerization process conducted at 275°C.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 64.03 g (0.5 mole) lithium benzoate, and 158.3 g NMP. Dehydration of the mixture by heating to 205°C yielded 19 ml of distillate containing 16.5 g water. To the residual mixture were charged 74.95 g (0.51 mole) DCB and 40 g NMP. The resulting mixture was heated for 3 hours at 275°C at a pressure of 90-135 psig. The reaction product was washed eight times with hot water and dried at 80°C under nitrogen in a vacuum oven to obtain a yield of 47.2 g (87.2%) poly(p-phenylene sulfide) having an inherent viscosity of 0.31, a melt flow of 124, a Tg of 88°C, and a $T_m$ of 281°C.

EXAMPLE XXVIII

This run demonstrates the use of lithium benzoate in a polymerization process conducted at 265°C for 6 hours following dehydration of a mixture to which water had been added.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 64.03 g (0.5 mole) lithium benzoate, 27.0 g water, and 158.3 g spectro grade NMP. Dehydration of the mixture by heating to 205°C yielded 48 ml of distillate containing 43.5 g water. To the residual mixture were charged 74.95 g (0.51 mole) DCB and 40 g NMP. The resulting mixture was heated for 6 hours at 265°C at a pressure of 70-125 psig. The reaction product, which consisted of fine balls in a gray solution, was washed eight times with hot water and dried at 80°C under nitrogen in a vacuum oven to obtain a yield of 46.5 g (86%) poly(p-phenylene sulfide), as very small spheres, having an inherent viscosity of 0.35, a melt flow of 93, a Tg of 88°C, and a $T_m$ of 280°C.

The above poly(p-phenylene sulfide), without prior curing, was melt spun at 285°C into monofilaments employing a one hole, 20 × 50 mil spinneret, and the filaments were drawn using several temperatures and draw ratios. The resulting filaments were then tested for tenacity, elongation, and initial modulus by the method shown in Example XX. The data, presented in Table V, illustrate the good properties, including the high tenacity of the filaments.

TABLE V

| Filament | Draw Temp., °C | Limit Draw Ratio | Denier | Tenacity, gpd | Elongation, % | Initial Modulus, gpd |
|---|---|---|---|---|---|---|
| A | 100 | 3.95X | 25.0 | 3.3 | 18 | 40 |
| B | 110 | 4.6X | 22.5 | 4.9 | 20 | 49 |
| C | 110 | 4.2X | 22.5 | 4.9 | 21 | 50 |

EXAMPLE XXIX

This run demonstrates the use of sodium benzoate in a polymerization process conducted at 265°C.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 72.06 g (0.5 mole) sodium benzoate, and 158.3 g NMP. Dehydration of the mixture by heating to 205°C yielded 15 ml of distillate containing 15.0 g water. To the residual mixture were charged 74.95 g (0.51 mole) DCB and 40 g NMP. The resulting mixture was heated for 3 hours at 265°C at a pressure of 70–110 psig. The reaction product was washed eight times with hot water and dried at 80°C under nitrogen in a vacuum oven to obtain a yield of 45.6 g (84.2%) poly(p-phenylene sulfide) having an inherent viscosity of 0.28, a melt flow of 665, a Tg of 86°C, and a $T_m$ of 281°C.

Thus, based on inherent viscosity and melt flow, the above polymer produced through use of sodium benzoate in a polymerization process conducted at 265°C was of much higher molecular weight than that obtained in the control run (Example XXV) employing no benzoate.

EXAMPLE XXX

This is another run demonstrating the use of sodium benzoate in a polymerization process conducted at 265°C.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 72.06 g (0.5 mole) sodium benzoate, and 158.3 g NMP. Dehydration of the mixture by heating to 205°C yielded 14 ml of distillate containing 13.8 g water. To the residual mixture were charged 74.95 g (0.51 mole) DCB and 40 g NMP. The resulting mixture was heated for 3 hours at 265°C at a pressure of 70–100 psig. The reaction product was washed eight times with hot water and dried at 80°C under nitrogen in a vacuum oven to obtain a yield of 42.2 g (78%) poly(p-phenylene sulfide) having an inherent viscosity of 0.33, a melt flow of 100, a Tg of 89°C, and a $T_m$ of 280°C.

Thus, again, the poly(p-phenylene sulfide) produced through use of sodium benzoate in a polymerizatation process conducted at 265°C was of much higher molecular weight than that obtained in the control run (Example XXV) employing no benzoate.

EXAMPLE XXXI

This is a control run in which poly(p-phenylene sulfide) was prepared in accordance with the method of U.S. Pat. No. 3,354,129.

To a stirred autoclave were charged 127.2 g (1.0 mole, 61.5% assay) sodium sulfide and 276.7 g NMP. Dehydration of the mixture by heating to 215°C yielded 22 ml of distillate containing 21.2 g water. To the residual mixture were charged 149.9 g (1.02 moles) DCB and 50 g NMP. The resulting mixture was heated for 3 hours at 245°C at a pressure of 20–100 psig. The reaction product was washed with hot water and dried under vacuum to obtain a yield of 100.8 g (93.2%) poly(p-phenylene sulfide) having ana inherent viscosity of 0.16, a Tg of 85°C, and a $T_m$ of 288°C.

EXAMPLE XXXII

This is a run, outside the scope of this invention, in which poly(p-phenylene sulfide) was prepared at 245°C, using sodium benzoate.

To a stirred autoclave were charged 127.2 g (1.0 mole, 61.5% assay) sodium sulfide, 14.4 g (0.1 mole) sodium benzoate, and 276.7 g NMP. Dehydration of the mixture by heating to 203°C yielded 23 ml of distillate containing 21.7 g water. To the residual mixture were charged 149.9 g (1.02 moles) DCB and 50 g NMP. The resulting mixture was heated for 3 hours at 245°C at a pressure of 60–155 psig. The reaction product was washed with hot water and dried under vacuum to obtain a yield of 100.2 g (92.6%) poly(p-phenylene sulfide) having an inherent viscosity of 0.17, a Tg of 85°C, and a $T_m$ of 286°C.

Thus, based on inherent viscosity, the molecular weight of the above polymer produced through use of sodium benzoate in the polymerization process conducted at 245°C was not greatly different than that of the polymer produced in the control run (Example XXXI) employing no benzoate.

EXAMPLE XXXIII

This is another run outside the scope of this invention in which poly(p-phenylene sulfide) was prepared at 245°C using sodium benzoate, this time at a higher concentration.

To a stirred autoclave were charged 127.2 g (1.0 mole, 61.5% assay) sodium sulfide, 144.1 g (1.0 mole) sodium benzoate, and 276.7 g NMP. Dehydration of the mixture by heating to 225°C yielded 22 ml of distillate containing 22 g water. To the residual mixture were charged 149.9 g (1.02 moles) DCB and 50 g NMP. The resulting mixture was heated for 3 hours at 245°C at a pressure of 40–85 psig. The reaction product was washed with hot water and dried to obtain a yield of 92.5 g (85.5%) poly(p-phenylene sulfide) having an inherent viscosity of 0.16, a Tg of 75°C, and a $T_m$ of 290°C.

Thus, based on inherent viscosity, the molecular weight of the above polymer produced through use of sodium benzoate in the polymerization process conducted at 245°C was the same as that of the polymer produced in the control run (Example XXXI) employing no benzoate.

EXAMPLE XXXIV

This is a control run outside the scope of this invention in which an arylene sulfide copolymer was produced through use of DCB and 2,5-dichloro-p-xylene.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), and 158.3 g NMP. Dehydration of the mixture by heating to 205°C yielded 14 ml of distillate containing 14 g water. To the residual mixture were charged 59.98 g (0.408 mole) DCB, 17.85 g (0.102 mole) 2,5-dichloro-p-xylene, and 40 g NMP. The resulting mixture was heated for 3 hours at 265°C at a pressure of 70–135 psig. The reaction product was washed eight times with hot water and dried at 80°C under nitrogen in a vacuum oven to obtain a yield of 53.2 g (93.7%) of arylene sulfide copolymer containing

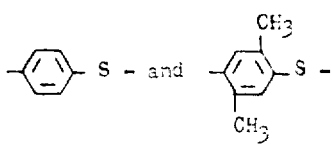

units, the copolymer having an inherent viscosity of 0.10, a Tg of 86°C, and no $T_m$.

EXAMPLE XXXV

This run demonstrates the use of lithium acetate in the preparation of an arylene sulfide copolymer, employing DCB and 2,5-dichloro-p-xylene.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 51.0 g (0.5 mole) lithium acetate dihydrate, and 158.3 g NMP. Dehydration of the mixture by heating to 205°C yielded 35 ml of distillate containing 32.0 g water. To the residual mixture were charged 59.98 g (0.408 mole) DCB, 17.85 g (0.102 mole) 2,5-dichloro-p-xylene, and 40 g NMP. The resulting mixture was heated for 3 hours at 265°C at a pressure of 70–110 psig. The reaction product was washed eight times with hot water and dried at 80°C under nitrogen in a vacuum oven to obtain a yield of 53.6g (94.4%) of arylene sulfide copolymer containing

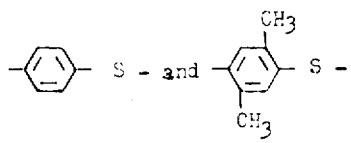

units, the copolymer having an inherent viscosity of 0.14, a Tg of 84°C, and no $T_m$.

Thus, based on inherent viscosity, the above copolymr produced through use of lithium acetate was of higher molecular weight than that obtained in the control run (Example XXXIV) employing no acetate.

EXAMPLE XXXVI

This run demonstrates the use of lithium acetate in the preparation of an arylene sulfide copolymer, employing DCB and 2,5-dichloro-p-xylene in a higher molar ratio (94:6) than that used in Example XXXV.

To a stirred autoclave were charged 65.2 g (0.5 mole, 60% assay) sodium sulfide, 0.2 g sodium hydroxide (to react with sodium bisulfide and sodium thiosulfate present in trace amounts in the sodium sulfide), 51.0 g (0.5 mole) lithium acetate dihydrate, and 158.3 g NMP. Dehydration of the mixture by heating to 205°C yielded 37 ml of distillate containing 34.4 g water. To the residual mixture were charged 70.47 g (0.4794 mole) DCB, 5.36 g (0.0306 mole) 2,5-dichloro-p-xylene, and 40 g NMP. The resulting mixture was heated for 3 hours at 265°C at a pressure of 70–115 psig. The reaction product was washed eight times with hot water and dried at 80°C under nitrogen in a vacuum oven to obtain a yield of 47.3 g of arylene sulfide copolymer containing

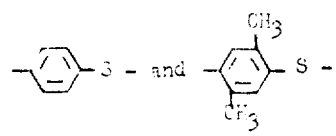

units, the copolymer having an inherent viscosity of 0.27, a melt flow of 539, a Tg of 90°C, and a $T_m$ of 267°C.

Thus, based on inherent viscosity and melt flow, the above copolymer had a desirably high molecular weight and should be suitable for melt spinning into fibers without prior curing.

It will be evident from the foregoing that various modifications can be made to the method of this invention. Such, however, are considered within the scope of the invention.

What is claimed is:

1. A method of producing polymers comprising:
   a. forming a composition by contacting at least one sulfur source, at least one p-dihalobenzene, at least one organic amide, at least one base and at least one alkali metal carboxylate, said sulfur source being selected from the group consisting of:
   1. thiosulfates selected from the group consisting of lithium, sodium, potassium, rubidium, cesium, magnesium, calcium, strontium and barium thiosulfates;
   2. substituted and unsubstituted thioureas;
   3. acyclic and cyclic thioamides;
   4. elemental sulfur;
   5. carbon disulfide and carbon oxysulfide;
   6. thiocarbamates;
   7. monothiocarbonates, dithiocarbonates and trithiocarbonates;
   8. mercaptans, mercaptides and sulfides having an alpha or beta activating substituent;
   9. phosphorus pentasulfide; and
   10. alkali metal bisulfides, and said alkali metal carboxylate has the formula $RCO_2M$ wherein R is a hydrocarbyl radical and M is an alkali metal, and said p-dihalobenzene has the formula

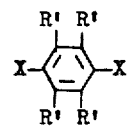

wherein each X is selected from the group consisting of chlorine, bromine, and iodine, and each R' is selected from the group consisting of hydrogen and hydrocarbyl with the proviso that in at least 50 mole percent of the p-dihalobenzene employed each R' must be hydrogen, and b. maintaining at least a portion of said composition at polymerization conditions to produce said polymer.

2. The method of claim 1 in which in said alkali metal carboxylate of the formula $RCO_2M$ the R is a hydrocarbyl radical selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl radicals having 1 to about 20 carbon atoms and M is an alkali metal selected from the group consisting of lithium sodium, potassium, rubidium and cesium, said base is selected from the group consisting of lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate and cesium carbonate, and in said p-dihalobenzene the hydrocarbyl can be alkyl, cycloalkyl and aryl radicals and combinations thereof such as alkaryl, aralkyl, with the total number of carbon atoms in each molecule being within the range of about 6 to about 24.

3. The method of claim 2 in which said sulfur source is selected from the group consisting of:
   a. at least one thiosulfate and said base is employed in an amount within the range of from about 1.5 to about 5 gram-equivalents per gram-mole of said thiosulfate;
   b. at least one substituted or unsubstituted thiourea and said base is employed in an amount within the range of from about 1 to about 6 gram-equivalents per gram-mole of thiourea;
   c. at least one thioamide or at least elemental sulfur and said base is employed in an amount within the range of from about 1 to about 5 gram-equivalents per gram-atom of sulfur in said thioamide or said elemental sulfur;
   d. at least one of carbon disulfide or carbon oxysulfide and said base is employed in an amount within the range of about 1 to about 6 gram-equivalents per gram-atom of sulfur in said carbon disulfide or said carbon oxysulfide;
   e. at least one thiocarbamate and said base is employed in an amount within the range of from about 1 to about 6 gram-equivalents per gram-atom of sulfur in said thiocarbamate;
   f. at least one monothiocarbonate or at least one dithiocarbonate and said base is employed in an amount within the range of from about 1 to about 6 gram-equivalents per gram-atom of sulfur in said monothiocarbonate or said dithiocarbonate;
   g. at least one trithiocarbonate and said base is employed in an amount within the range of from about 2 to about 8 gram-equivalents per gram-mole of said trithiocarbonate;
   h. at least one organic sulfur-containing compound selected from the group consisting of mercaptans, mercaptides and sulfides having an alpha or a beta activating substituent and said base is employed in an amount within the range of from about 1.1 to about 5 gram-equivalents per gram-atom of divalent sulfur in said organic sulfur-containing compound, with the proviso that when said organic sulfur-containing compound is employed as a metal mercaptide, the base requirement is reduced by one gram-equivalent per gram-atom of divalent sulfur in said metal mercaptide;
   i. phosphorus pentasulfide and said base is employed in an amount within the range of from about 5 to about 25 gram-equivalents per gram-mole of phosphorus pentasulfide and
   j. at least one alkali metal bisulfide and said base is employed in an amount within the range of from about 0.3 to about 4 gram-equivalents per gram-mole of alkali metal bisulfide.

4. The method of claim 3 in which said sulfur source and the amount of said base are as defined in at least one of (a), (b), (c), (d), (e), (f), (g), (h), (i) and (j) and said p-dihalobenzene is employed in an amount within the range of from about 0.8 to about 2 gram-moles per gram-atom of divalent or elemental sulfur in said sulfur source.

5. The method of claim 3 in which said alkali metal carboxylate is employed in an amount within the range of from about 0.05 to about 4 gram-moles per gram-mole of p-dihalobenzene and said organic amide is employed in an amount within the range of from about 100 to about 2500 grams per gram-mole of p-dihalobenzene.

6. The method of claim 2 in which water is present in said composition in an amount up to about 1 gram-mole per gram-mole of said p-dihalobenzene.

7. The method of claim 2 in which water is removed from said composition.

8. A method of producing polymers comprising:
   a. forming a composition by contacting at least one substance selected from the group consisting of alkali metal sulfides and alkali metal bisulfides, at least one p-dihalobenzene, at least one organic amide and at least one alkali metal carboxylate, said p-dihalobenzene being represented by the formula

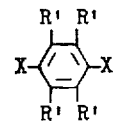

wherein each X is selected from the group consisting of chlorine, bromine, and iodine, and each R' is selected from the group consisting of hydrogen and hydrocarbyl with the proviso that in at least 50 mole percent of the p-dihalobenzene employed each R' must be hydrogen, said alkali metal sulfide being represented by the formula $M_2S$ wherein M is an alkali metal selected from the group consisting of sodium, potassiumk lithium, rubidium and cesium, the alkali metal of said alkali metal bisulfide being selected from the group consisting of sodium, potassium, lithium, rubidium and cesium and said alkali metal carboxylate has the formula $RCO_2M$ wherein R is a hydrocarbyl radical and M is an alkali metal; and
   b. maintaining at least a portion of said composition at polymerization conditions to produce said polymer.

9. A method of claim 8 wherein in said p-dihalobenzene the hydrocarblyl can be alkyl, cycloalkyl and aryl radicals and combinations thereof such as alkaryl, aralkyl, with the total number of carbon atoms in each molecule being within the range of about 6 to about 24, said hydrocarbyl radical in said alkali metal carboxylate is selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl radicals having 1 to about 20 carbon atoms, and the alkali metal in said alkali metal carboxylate is selected from the group consisting of lithium, sodium, potassium, rubidium and cesium.

10. The method of claim 9 in which said substance is an alkali metal sulfide and the ratio of gram-moles of p-dihalobenzene to gram-atoms of divalent sulfur in said alkali metal sulfide is within the range of from about 0.8 to about 2, the gram-moles of alkali metal carboxylate per gram-mole of p-dihalobenzene is within the range of from about 0.05 to about 4 and the grams of organic amide per gram-mole of p-dihalobenzene is within the range of from about 100 to about 2500.

11. The method of claim 9 in which said substance is an alkali metal bisulfide and the ratio of gram-moles of alkali metal bisulfide employed per gram-mole of p-dihalobenzene is within the range of from about 0.8 to about 1.5, the gram-moles of alkali metal carboxylate per gram-mole of p-dihalobenzene is within the range of from about 0.05 to about 4 and the grams of organic amide per gram-mole of p-dihalobenzene is within the range of from about 100 to about 2500.

12. The method of claim 9 in which water is present in said composition in an amount up to about 1 gram-mole per gram-mole of p-dihalobenzene.

13. The method of claim 9 in which water is removed from said composition.

14. A method of producing a polymer which comprises:
  a. contacting at least one sulfur source, at least one alkali metal carboxylate, at least one organic amide and at least one base to form a first composition, said sulfur source being selected from the group consisting of:
    1. thiosulfates selected from the group consisting of lithium, sodium, potassium, rubidium, cesium, magnesium, calcium, strontium and barium thiosulfates;
    2. substituted and unsubstituted thioureas;
    3. acyclic and cyclic thioamides;
    4. elemental sulfur;
    5. carbon disulfide and carbon oxysulfide;
    6. thiocarbamates;
    7. monothiocarbonates, dithiocarbonates and trithiocarbonates;
    8. mercaptans, mercaptides and sulfides having an alpha or beta activating substituent;
    9. phosphorus pentasulfide; and
    10. alkali metal bisulfides, and said alkali metal carboxylate
  has the formula RCO$_2$M wherein R is a hydrocarbyl radical and M is an alkali metal to form a first composition;
  b. contacting at least a portion of said first composition with at least one p-dihalobenzene, to form a second composition, said p-dihalobenzene having the formula

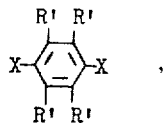

wherein each X is selected from the group consisting of chlorine, bromine, and iodine, and each R' is selected from the group consisting of hydrogen and hydrocarbyl with the proviso that in at least 50 mole percent of the p-dihalobenzene employed each R' must be hydrogen; and
  c. maintaining at least a portion of said second composition at polymerization conditions to form said polymer.

15. A method of claim 14 in which the hydrocarbyl radical of said alkali metal carboxylate is selected from alky, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl radicals having 1 to about 20 carbon atoms and the alkali metal of said alkali metal carboxylate is selected from the group consisting of lithium, sodium, potassium, rubidium and cesium, said. base is selcted from the group consisting of lithium hydroxide, sodium hydroxide, potassium hydroxide, rubidium hydroxide, cesium hydroxide, magnesium hydroxide, calcium hydroxide, strontium hydroxide, barium hydroxide, sodium carbonate, potassium carbonate, rubidium carbonate and cesium carbonate, and said hydrocarbyl in said p-dihalobenzene is selected from alkyl, cycloalkyl, and aryl radicals and combinations thereof, the total number of carbon atoms in each molecule being within the range of about 6 to about 24.

16. The method of claim 15 in which said sulfur source is selected from the group consisting of:
  a. at least one thiosulfate and said base is employed in an amount within the range of from about 1.5 to about 5 gram-equivalents per gram-mole of said thiosulfate;
  b. at least one substituted or unsubstituted thiourea and said base is employed in an amount within the range of from about 1 to about 6 gram-equivalents per gram-mole of thiourea;
  c. at least one acyclic or cyclic thioamide or at least elemental sulfur and said base is employed in an amount within the range of from about 1 to about 5 gram-equivalents per gram-atom of sulfur in said thioamide or said elemental sulfur;
  d. at least one of carbon disulfide or carbon oxysulfide and said base is employed in an amount within the range of from about 1 to about 6 gram-equivalents per gram-atom of sulfur in said carbon disulfide or said carbon oxysulfide;
  e. at least one thiocarbamate and said base is employed in an amount within the range of from about 1 to about 6 gram-equivalents per gram-atom of sulfur in said thiocarbamate;
  f. at least one of monothiocarbonates and dithiocarbonates and said base is employed in an amount within the range of from about 1 to about 6 gram-equivalents per gram-atom of sulfur in said monothiocarbonate or said dithiocarbonate;
  g. at least one trithiocarbonate and said base is employed in an amount within the range of from about 2 to about 8 gram-equivalents per gram-mole of said trithiocarbonate;
  h. at least one organic sulfur-containing compound selected from the group consisting of mercaptans, mercaptides and sulfides having an alpha or beta activating substituent and said base is employed in an amount within the range of from about 1.1 to about 5 gram-equivalents per gram-atom of divalent sulfur in said organic sulfur-containing compound, with the proviso that when said organic sulfur-containing compound is employed as a metal mercaptide, the base requirement is reduced by one gram-equivalent per gram-atom of divalent sulfur in said metal mercaptide;

i. phosphorus pentasulfide and said base is employed in an amount within the range of from about 5 to about 25 gram-equivalents per gram-mole of phosphorus pentasulfide; and j. at least one alkali metal bisulfide and said base is employed in an amount within the range of from about 0.3 to about 4 gram-equivalents per gram-mole of alkali metal bisulfide.

17. The method of claim 16 in which said sulfur source and the amount of said base are as defined in at least one of (a), (b), (c), (d), (e), (f), (g), (h), (i) and (j) and said p-dihalobenzene is employed in an amount within the range of from about 0.8 to about 2 gram-moles per gram-atom of divalent or elemental sulfur in said sulfur source.

18. The method of claim 15 in which said alkali metal carboxylate is employed in an amount within the range of from about 0.05 to about 4 gram-moles per gram-mole of p-dihalobenzene and said organic amide is employed in an amount within the range of from about 100 to about 2500 grams per gram-mole of p-dihalobenzene.

19. The method of claim 15 in which water is present in said second composition in an amount up to about 1 gram-mole per gram-mole of p-dihalobenzene.

20. The method of claim 15 in which water is removed from said first composition or from said second composition.

21. A method of producing polymers comprising:
a. contacting at least one alkali metal sulfide or alkali metal bisulfide, at least one organic amide and at least one alkali metal carboxylate to form a first composition, said alkali metal sulfide having the formula $M_2S$ wherein M is an alkali metal selected from the group consisting of sodium, potassium, lithium, rubidium, and cesium, the alkali metal of said alkali metal bisulfide being selected from the group consisting of sodium, potassium, lithium, rubidium and cesium and said alkali metal carboxylate having the formula $RCO_2M$ wherein R is a hydrocarbyl radical and M is an alkali metal;
b. contacting at least a portion of said first composition with at least one p-dihalobenzene to form a second composition, said p-dihalobenzene having the formula

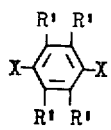

wherein each X is selected from the group consisting of chlorine, bromine, and iodine, and each R' is selected from the group consisting of hydrogen and hydrocarbyl with the proviso that in at least 50 mole percent of the p-dihalobenzene employed each R' must be hydrogen; and
c. maintaining at least a portion of said second composition at polymerization conditions to form said polymer.

22. A method of claim 21 in which the hydrocarbyl radical of said alkali metal carboxylate is selected from alkyl, cycloalkyl, and aryl and combinations thereof such as alkylaryl, alkylcycloalkyl, cycloalkylalkyl, arylalkyl, arylcycloalkyl, alkylarylalkyl and alkylcycloalkylalkyl radicals having 1 to about 20 carbon atoms, said alkali metal of said alkali metal carboxylate is selected from the group consisting of lithium, sodium, potassium, rubidium an cesium, and said hydrocarbyl in said p-dihalobenzene is selected from alkyl, cycloalkyl, and aryl radicals and combinations thereof, the total number of carbon atoms in each molecule being within the range of about 6 to about 24.

23. The method of claim 22 in which an alkali metal sulfide is contacted and the ratio of gram-moles of p-dihalobenzene to gram-atoms of divalent sulfur in said alkali metal sulfide is within the range of from about 0.8 to about 2, the gram-moles of alkali metal carboxylate per gram-mole of p-dihalobenzene is within the range of from about 0.05 to about 4 and the grams of organic amide per gram-mole of p-dihalobenzene is within the range of from about 100 to about 2500.

24. The method of claim 22 in which an alkali metal bisulfide is contacted and the ratio of gram-moles of alkali metal bisulfide employed per gram-mole of p-dihalobenzene is within the range of from about 0.8 to about 1.5, the gram-moles of alkali metal carboxylate per gram-mole of p-dihalobenzene is within the range of from about 0.05 to about 4 and the grams of organic amide per gram-mole of p-dihalobenzene are within the range of from about 100 to about 2500.

25. The method of claim 22 in which said substance is an alkali metal sulfide, R in said alkali metal carboxylate is an alkyl radical containing 1 to about 6 carbon atoms or a phenyl radical, M in said alkali metal carboxylate is lithium, said p-dihalobenzene is a p-dichlorobenzene of the formula

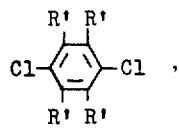

wherein each R' is selected from the group consisting of hydrogen and hydrocarbyl with the proviso that within at least 90 mole percent of the p-dichlorobenzene employed each R' must be hydrogen and said organic amide is N-methyl-2-pyrrolidone, said p-dichlorobenzene is employed in an amount within the range of from about 0.95 to about 1.1 gram-moles per gram-atom of sulfur in said alkali metal sulfide, said alkali metal carboxylate is employed in an amount within the range of from about 0.5 to about 2 gram-moles per gram-mole of said p-dichlorobenzene, said N-methyl-2-pyrrolidone is employed in an amount within the range of from about 100 to about 2500 grams per gram-mole of p-dichlorobenzene, said polymerization is carried out at a temperature within the range of from about 250°C to about 280°C and said first composition is dehydrated prior to maintaining said second composition at polymerization conditions.

26. The method of claim 22 in which an alkali metal sulfide is contacted, R in said alkali metal carboxylate is an alkyl radical having 1 to 6 carbon atoms or a phenyl radical, M in said alkali metal carboxylate is lithium, said p-dihalobenzene is a p-dichlorobenzene of the formula

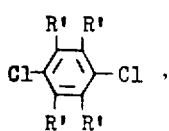

wherein each R' is selected from the group consisting of hydrogen and hydrocarbyl with the proviso that within at least 90 mole percent of the p-dichlorobenzene employed each R' must be hydrogen and said organic amide is N-methyl-2-pyrrolidone, said p-dichlorobenzene is employed in an amount within the range of from about 0.95 to about 1.1 gram-moles per gram-atom of sulfur in said alkali metal sulfide, said alkali metal carboxylate is employed in an amount within the range of from about 0.5 to about 2 gram-moles per gram-mole of said p-dichlorobenzene, said N-methyl-2-pyrrolidone is employed in an amount within the range of from about 100 to about 2500 grams per gram-mole of p-dichlorobenzene, said polymerization is carried out at a temperature within the range of from about 250°C to about 280°C and said first composition of said second composition is dehydrated prior to maintaining said second composition at polymerization conditions.

27. The method of claim 22 in which an alkali metal sulfide is contacted, said alkali metal sulfide is sodium sulfide and said alkali metal carboxylate is sodium acetate.

28. The method of claim 22 in which an alkali metal sulfide is contacted, said alkali metal sulfide is sodium sulfide and said alkali metal carboxylate is potassium acetate.

29. The method of claim 26 in which said alkali metal carboxylate is lithium acetate.

30. The method of claim 22 in which said alkali metal carboxylate is selected from sodium acetate, sodium propionate and lithium acetate.

31. The method of claim 22 in which an alkali metal sulfide is contacted, said alkali metal sulfide is sodium sulfide and said alkali metal carboxylate is lithium benzoate.

32. The method of claim 22 in which said alkali metal carboxylate is sodium benzoate.

33. A p-phenylene sulfide polymer composition having a melt flow within the range of from about 50 to about 700, said composition being in the uncured state.

34. A composition of claim 33 wherein the p-phenylene sulfide polymer is poly(p-phenylene sulfide).

35. The p-phenylene sulfide polymer composition of claim 33, said composition having an inherent viscosity of at least about 0.25.

36. The composition of claim 35 wherein said p-phenylene sulfide polymer is poly(p-phenylene sulfide).

37. A p-phenylene sulfide polymer composition comprising an uncured filament having a tenacity of at least 1 gram per denier, said polymer having a melt flow within the range of from about 50 to about 700 prior to spinning.

38. A composition of claim 37 wherein the p-phenylene sulfide polymer is poly(p-phenylene sulfide).

39. An uncured fiber of p-phenylene sulfide polymer, said fiber having a tenacity of at least 1 gram per denier.

40. The uncured fiber of claim 39 wherein said p-phenylene sulfide polymer is poly(p-phenylene sulfide).

41. The method of claim 22 in which said alkali metal carboxylate is sodium acetate and said organic amide is N-methyl-2-pyrrolidone.

42. The method of claim 15 in which said alkali metal carboxylate is sodium acetate and said sulfur source is elemental sulfur or carbon disulfide.

43. The method of claim 15 in which said sulfur source is N-methyl-2-pyrrolidinethione.

44. The method of claim 15 in which said alkali metal carboxylate is formed in situ.

45. A polymer composition of claim 33 wherein the p-phenylene sulfide polymer comprises a copolymer comprises a copolymer containing

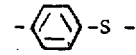

and

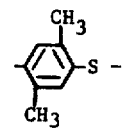

units.

* * * * *

UNITED STATES PATENT AND TRADEMARK OFFICE
CERTIFICATE OF CORRECTION

PATENT NO. : 3,919,177
DATED : November 11, 1975
INVENTOR(S) : Robert W. Campbell It is certified that error appears in the above-identified patent and that said Letters Patent are hereby corrected as shown below:

Column 26, line 55, "potassiumk" should be --- potassium, ---

Column 28, line 13, "alky," should be --- alkyl, ---

Column 30, line 9, "an" should be ---- and ----

Column 32, line 33, delete "comprises a copolymer".

Signed and Sealed this sixteenth Day of March 1976

[SEAL]

Attest:

RUTH C. MASON
*Attesting Officer*

C. MARSHALL DANN
*Commissioner of Patents and Trademarks*